United States Patent
Cremer et al.

(10) Patent No.: US 9,874,177 B2
(45) Date of Patent: Jan. 23, 2018

(54) GASEOUS FUEL ADMIXING DEVICE FOR A GAS-POWERED INTERNAL COMBUSTION ENGINE

(71) Applicant: NONOX B.V., Hoensbroek (NL)

(72) Inventors: Peter-Josef Cremer, Kelmis (BE); Hans-Peter Kraemer, Augsburg (DE)

(73) Assignee: NONOX B.V., Hoensbroek (NL)

( * ) Notice: Subject to any disclaimer, the term of this patent is extended or adjusted under 35 U.S.C. 154(b) by 119 days.

(21) Appl. No.: 14/647,173

(22) PCT Filed: Nov. 30, 2012

(86) PCT No.: PCT/EP2012/004953
§ 371 (c)(1),
(2) Date: May 26, 2015

(87) PCT Pub. No.: WO2014/082650
PCT Pub. Date: Jun. 5, 2014

(65) Prior Publication Data
US 2015/0322894 A1 Nov. 12, 2015

(51) Int. Cl.
*F02M 21/02* (2006.01)
*F02M 21/04* (2006.01)
(Continued)

(52) U.S. Cl.
CPC ......... *F02M 21/04* (2013.01); *F02D 41/0027* (2013.01); *F02M 21/0233* (2013.01);
(Continued)

(58) Field of Classification Search
CPC .. F02M 21/02; F02M 21/023; F02M 21/0233; F02M 21/0257; F02M 21/0278;
(Continued)

(56) References Cited

U.S. PATENT DOCUMENTS 5,887,574 A 3/1999 Smith
6,073,619 A * 6/2000 Baranowski .......... F02D 31/007
123/527

(Continued)

FOREIGN PATENT DOCUMENTS

AT 502512 A4 4/2007
CN 1183826 A 6/1998
(Continued)

OTHER PUBLICATIONS

English translation of International Search Report from parent application No. PCT/EP2012/004953.
(Continued)

*Primary Examiner* — Jacob Amick
*Assistant Examiner* — Charles Brauch
(74) *Attorney, Agent, or Firm* — J-Tek Law PLLC; Jeffrey D. Tekanic; Scott T. Wakeman (57) ABSTRACT

A device for mixing a gaseous fuel into an oxygen-containing gas flow of a gas-powered internal combustion engine includes a housing component having an inlet that connects to a gaseous fuel supply conduit and a slit that opens into an intake pipe. The slit has a longitudinal extension that is oriented approximately perpendicular to the axial direction of the intake pipe. A valve body is movable relative to the housing component. An annular gap between the valve body and an outlet opening of the housing component has a cross-sectional area that varies in accordance with changes in the position of the valve body relative to the housing component. The annular gap determines the flow-through cross-section of a passageway between the inlet and the outlet. Furthermore, a gaseous fuel flow exiting from the slit is directed approximately perpendicular to the axial direction of the intake pipe.

20 Claims, 4 Drawing Sheets

(51) Int. Cl.
*F02D 41/00* (2006.01)
*F02M 35/10* (2006.01)

(52) U.S. Cl.
CPC .... *F02M 21/0254* (2013.01); *F02M 21/0263* (2013.01); *F02M 21/0278* (2013.01); *F02M 21/0281* (2013.01); *F02M 35/10216* (2013.01); *Y02T 10/32* (2013.01)

(58) Field of Classification Search
CPC ............... F02M 21/04; F02M 21/0248; F02B 2043/103; F02D 19/02
USPC .......................................................... 123/527
See application file for complete search history.

(56) References Cited

U.S. PATENT DOCUMENTS

| | | | |
|---|---|---|---|
| 6,405,947 | B2 | 6/2002 | Fochtman |
| 6,508,418 | B1 | 1/2003 | Fochtman et al. |
| 6,651,422 | B1* | 11/2003 | LeGare ................. F01N 11/002 60/274 |
| 6,666,193 | B2 | 12/2003 | Ricco |
| 7,621,469 | B2 | 11/2009 | Hornby |
| 2002/0117156 | A1 | 8/2002 | Ricca |
| 2007/0068496 | A1* | 3/2007 | Wright ............... F02M 21/0239 123/527 |
| 2008/0135020 | A1 | 6/2008 | Hornby |
| 2009/0143955 | A1* | 6/2009 | Uitenbroek ........... F02B 37/007 701/103 |
| 2011/0146631 | A1* | 6/2011 | Konohara .......... F02M 25/0872 123/520 |

FOREIGN PATENT DOCUMENTS

| | | |
|---|---|---|
| DE | 3410909 A1 | 10/1985 |
| DE | 19528556 A1 | 2/1997 |
| DE | 60025090 T2 | 6/2006 |
| DE | 102006051791 A1 | 5/2008 |
| DE | 102011103612 A1 | 12/2012 |
| EP | 1336747 A2 | 8/2003 |
| WO | 9635863 A1 | 11/1996 |

OTHER PUBLICATIONS

English translation of Written Opinion from parent application No. PCT/EP2012/004953.
Office Action dated May 10, 2012 in counterpart German patent application No. 10 2011 103 612.5, including English translation of substantive portions thereof.
Office Action dated Mar. 24, 2015 in counterpart German patent application No. 10 2011 103 612.5, including English translation of substantive portions thereof.
Chinese Office Action dated Mar. 21, 2017 in counterpart Chinese application No. 201280077104.1, and machine ranslation of substantive rejections made therein.

* cited by examiner

GASEOUS FUEL ADMIXING DEVICE FOR A GAS-POWERED INTERNAL COMBUSTION ENGINE

CROSS-REFERENCE

This application is the U.S. National Stage of International Application No. PCT/EP2012/004953 filed on Nov. 30, 2012.

TECHNICAL FIELD

The invention relates to a gaseous fuel admixing device for a gas-powered internal combustion engine.

RELATED ART

For a fault-free and low-pollution combustion of gas-powered internal combustion engines, a precise admixing of the gaseous fuel into the air flowing through an intake pipe of the internal combustion engine is required.

A gas metering valve configured as a gaseous fuel injection value for the combustion chamber of a reciprocating gas engine is known from AT 502 512 A4 2007-04-15, the valve body of which is actuated by an electromagnet and has a contour such that the cross-sectional area of a gap formed between the valve body and an outlet opening varies linearly with movement of the valve body.

A flow valve for controlling the air mass flow-rate is known from DE 34 10 909 A1, the valve body of which has an outer surface or contour such that the cross-sectional area of a gap formed between the valve and an outlet opening progressively increases with movement of the valve body in an opening direction.

A gaseous fuel metering valve is described in U.S. Pat. No. 6,508,418 B1, the valve body of which ends in a spherical surface, which abuts on a conically-narrowing seat surface in the closed position. DE 600 25090 T2 describes a gas metering valve configured similar thereto.

U.S. Pat. No. 7,621,469 B2 describes a gas metering valve, in which the valve member is formed as a sphere and abuts on a valve seat, which narrows in a spherically-shaped manner, in the closed position.

U.S. Pat. No. 6,666,193 B2 describes a gas metering valve, the valve body of which ends in a spherical end surface, the radius of curvature of which is the same as the radius of curvature of an end portion of a seat surface.

SUMMARY

In one aspect of the present teachings, a gaseous fuel admixing device for a gas-powered internal combustion engine is provided that is capable of supplying a predetermined composition, which is as homogeneous as possible, of the gaseous fuel-air mixture to a combustion chamber of the internal combustion engine.

In another aspect of the present teachings, a gaseous fuel admixing device for a gas-powered internal combustion engine preferably includes a housing component that is connectable to an intake pipe of the internal combustion engine, the housing having an inlet for attachment to a gaseous fuel supply conduit and an outlet configured to open into the intake pipe. A valve body is movable relative to the housing component. An annular gap is formed between the valve body and an outlet opening of the housing component. The cross-sectional area of the annular gap preferably depends on (changes in accordance with) the position of the valve body relative to the outlet opening and the annular gap determines the flow-through cross-section of a connection from the inlet to the outlet. The gaseous fuel admixing device is preferably configured such that a gaseous fuel flow exiting from the outlet is directed (ejected or sprayed) approximately perpendicular to the axial direction of the intake pipe.

In the inventive gaseous fuel admixing device, since the gaseous fuel-flow flows into the air flow approximately perpendicular to the air flow directed through the intake pipe, a good mixture of the two flows is achieved.

According to another aspect of the present teachings, the valve body preferably is linearly and axially movable relative to the outlet opening and the outer contour of the valve body preferably is shaped such that the cross-sectional area of the annular gap formed between the outlet opening and the valve body changes in progressive dependence on the position of the valve body relative to the outlet opening. It is possible with such features of to mix the gaseous fuel, on a need-based manner, to maintain a predetermined mixture ratio, which is precise as possible and which can vary in dependence on (accordance with) the load of the internal combustion engine.

According to another aspect of the present teachings, the outlet opening is preferably formed as a slit and the longitudinal extension (direction) of the slit is oriented approximately perpendicular to the axial direction of the intake pipe. With such features, it is achieved that the gaseous fuel flow entering into the intake pipe thoroughly infuses into the flow present in the intake pipe.

The invention will be explained in the following with the assistance of schematic drawings of an exemplary embodiment.

DETAILED DESCRIPTION OF THE PREFERRED EMBODIMENTS

Figure 1:
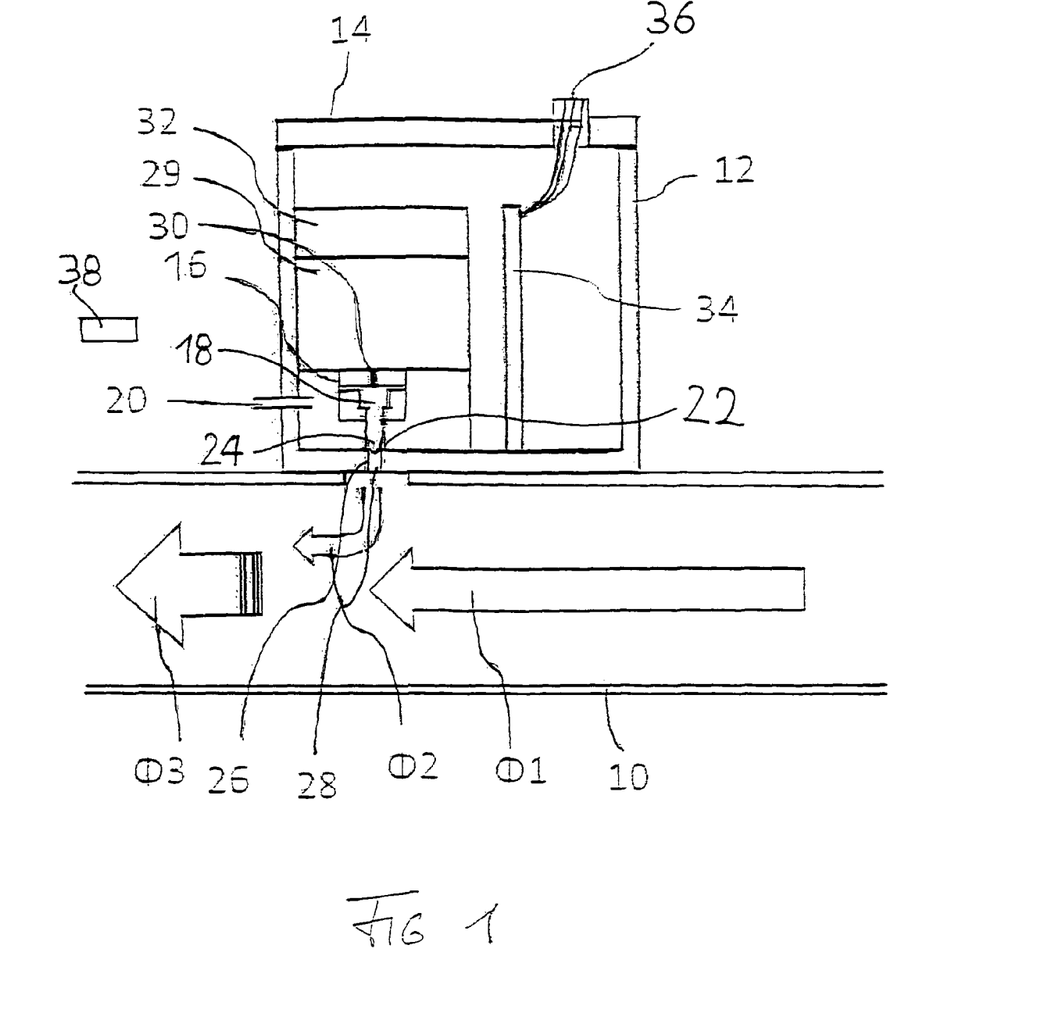
FIG. 1 depicts a section through an inventive gaseous fuel admixing device, cut in a longitudinally middle plane of the intake pipe.

FIG. 1 shows a sectional view of an inventive gaseous fuel admixing device, cut in a longitudinal middle plane of an intake pipe 10 of a not-depicted internal combustion engine. The intake pipe 10 can be an intake pipe that leads to a single cylinder of the internal combustion engine or can be an intake manifold, which is connected to plural cylinders. For example, a fresh air flow $\Phi 1$ flows through the intake pipe 10, which fresh air flow can be aspirated by the internal combustion engine or can be pressurized by a supercharger. The flow $\Phi 1$ can contain only fresh air or can contain, for example, additional exhaust gas, which is fed back.

A housing 12 of the gaseous fuel admixing device, which is denoted with 14 as a whole, is affixed to the intake pipe 10; for example it is screw fastened to the intake pipe 10. A guide component 16 is disposed in the housing; a valve body 18 is guided in the guide component 16 in a longitudinally-movable manner, in the depicted example in the vertical direction. A gaseous fuel supply conduit 20 leads into an inner chamber of the housing 12. The guide component 16 ends in an outlet opening 22 formed in the bottom wall of the housing; a metering end portion 24 of the valve body 18 projects into the outlet opening 22 more or less deep in accordance with its position. According to FIG. 1, the outlet opening 22 is formed at the upper end of a flow guiding surface 26, which connects the outlet opening 22 with an outlet 28 that opens into the intake pipe 10.

An actuator 29, e.g., a step motor, whose output shaft 30 is screw fastened to the valve body 18, serves to move the valve body 18, so that the valve body moves linearly with rotation of the output shaft. The rotational position of the output shaft 30 can be sensed by a rotary position encoder/sensor 32.

Further, an electronic control apparatus 34 is accommodated in the housing 12, and supplies signals via wires 36; such signals may include a load signal, which indicates the position of a not-depicted load controlling element for adjusting the load output) of the internal combustion engine, the output signal of the rotary position encoder 32, the output signal of an oxygen sensor 38 disposed in the exhaust system, as well as optionally additional signals, such as the temperature of the internal combustion engine, the mass flow of the flow Φ1 within the intake pipe 10, the pressure in the intake pipe 10, etc. The functions of the above-described functional groups are generally known and thus will not be described in further detail. The gaseous fuel supply conduit 20 is connected with a gaseous fuel source, which supplies gaseous fuel to the gaseous fuel supply conduit 20, preferably at a constant pressure. This gaseous fuel is fed into the intake pipe flow Φ1 in an amount, which is determined by the position of the valve body 18 relative to the outlet opening 22 and the pressure difference between the pressure in the intake pipe 10 and the pressure of the gaseous fuel. The gaseous fuel is exhausted through the outlet 28 as a gaseous fuel flow Φ2 approximately perpendicular to the direction of the intake pipe flow Φ1 and is redirected by the intake pipe flow Φ1 while mixing therein, so that a mixture flow Φ3 is supplied to the internal combustion engine.

Further details of the inventive gaseous fuel admixing device will be explained with the assistance of the following Figures.

Figure 2:
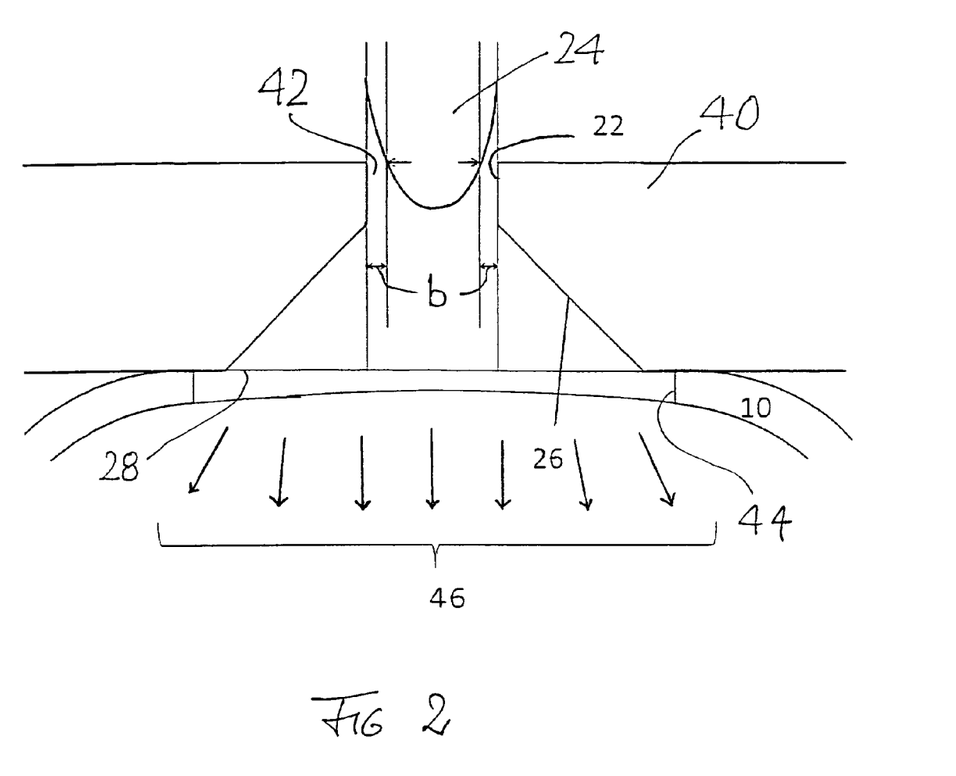
FIG. 2 depicts a section through the gaseous fuel admixing device in the region of the inflow of the gaseous fuel into the intake pipe, cut perpendicular to the longitudinal axis of the intake pipe.
Figure 3:
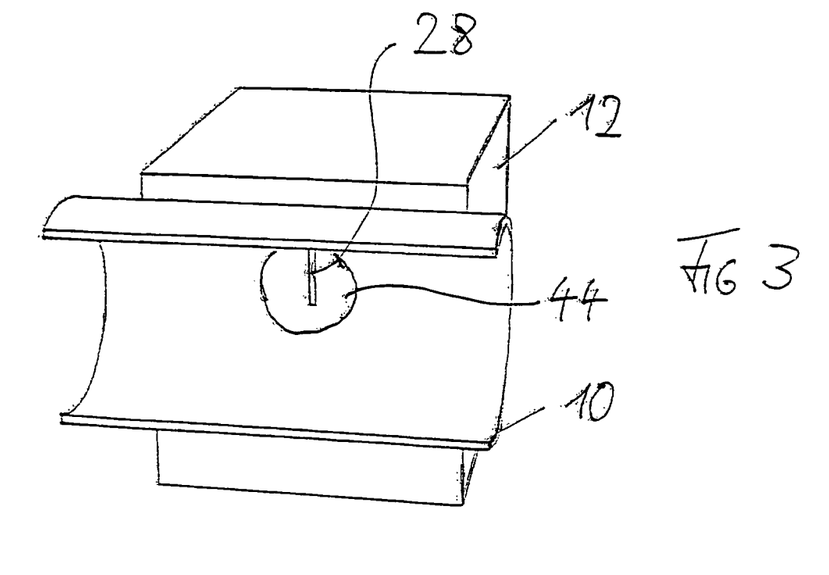
FIG. 3 depicts a perspective view of the inflow region of the gaseous fuel into the intake pipe in a cut-away intake pipe.
Figure 4:
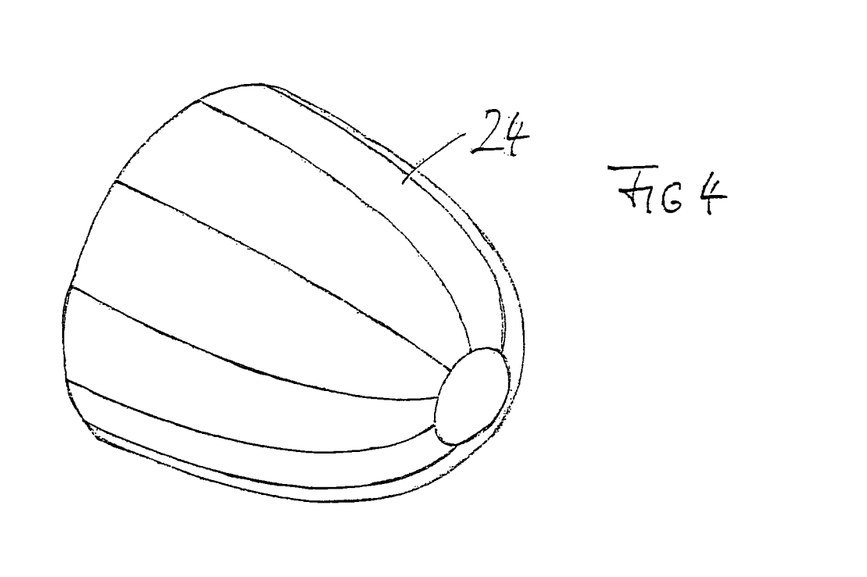
FIG. 4 depicts a perspective view of the valve body.

FIGS. 2 to 4 show structural details:

FIG. 2 shows an enlarged sectional view of the metering end portion 24 of the valve body 18 (FIG. 1) in a sectional view similar to FIG. 1, but cut perpendicular to the longitudinal axis of the intake pipe 10. The metering end portion 24 projects in a vertically movable manner into the outlet opening 22, which is formed directly in a bottom wall 40 of the housing 12 in the depicted example. The outlet opening 22 has a segment with a circular cylindrical cross-section that transitions via the flow guiding surface 26 into the outlet 28, which opens into the intake pipe 10. Depending on the position of the metering end portion 24 relative to the outlet opening 22, an annular gap 42 having a variable width b indicated by the double arrows is formed, through which the gaseous fuel flows into the intake pipe 10. The cross-sectional shape of the flow guiding surface 26, which widens in a funnel-shaped manner in the illustration of FIG. 2, transitions from a circular-shaped cross-section (cut perpendicular to the direction of movement of the valve body) into a slit-shaped cross-section in the region of the outlet 28. FIG. 3 depicts a perspective view towards the outlet 28 in a cut-away intake pipe 10, and shows the slit-shaped outlet 28, as viewed through a hole 44 in the wall of the intake pipe 10. The longitudinal direction of the slit 28 is perpendicular to the axial direction of the intake pipe 10, so that gaseous fuel flows into the intake pipe flow Φ1 (FIG. 1) in the shape of a fan or a flat-spray due to the flow guiding surface 26, which widens in a plane perpendicular to the axial direction of the intake pipe, wherein substantially the entire cross-section of the intake pipe 10 is encompassed by the gaseous fuel flow Φ2 and a thoroughly-homogenously mixed mixture flow Φ3 results, which arrives in the combustion chamber of the not-depicted internal combustion engine. The slit-shaped outlet 28, together with the flow guiding surface 26, forms a flat-spray nozzle.

The contour or outer surface of the metering end portion 24 of the valve body 18, which is illustrated in an exemplary manner in FIG. 4, is such that the through-flow cross-section formed by the annular gap 42 for the gaseous fuel increases progressively, preferably exponentially, starting from a minimal value in a lower end position of the valve body according to FIG. 2 to a maximal value, which is defined by the cross-sectional area of the outlet opening 22.

Figure 5:
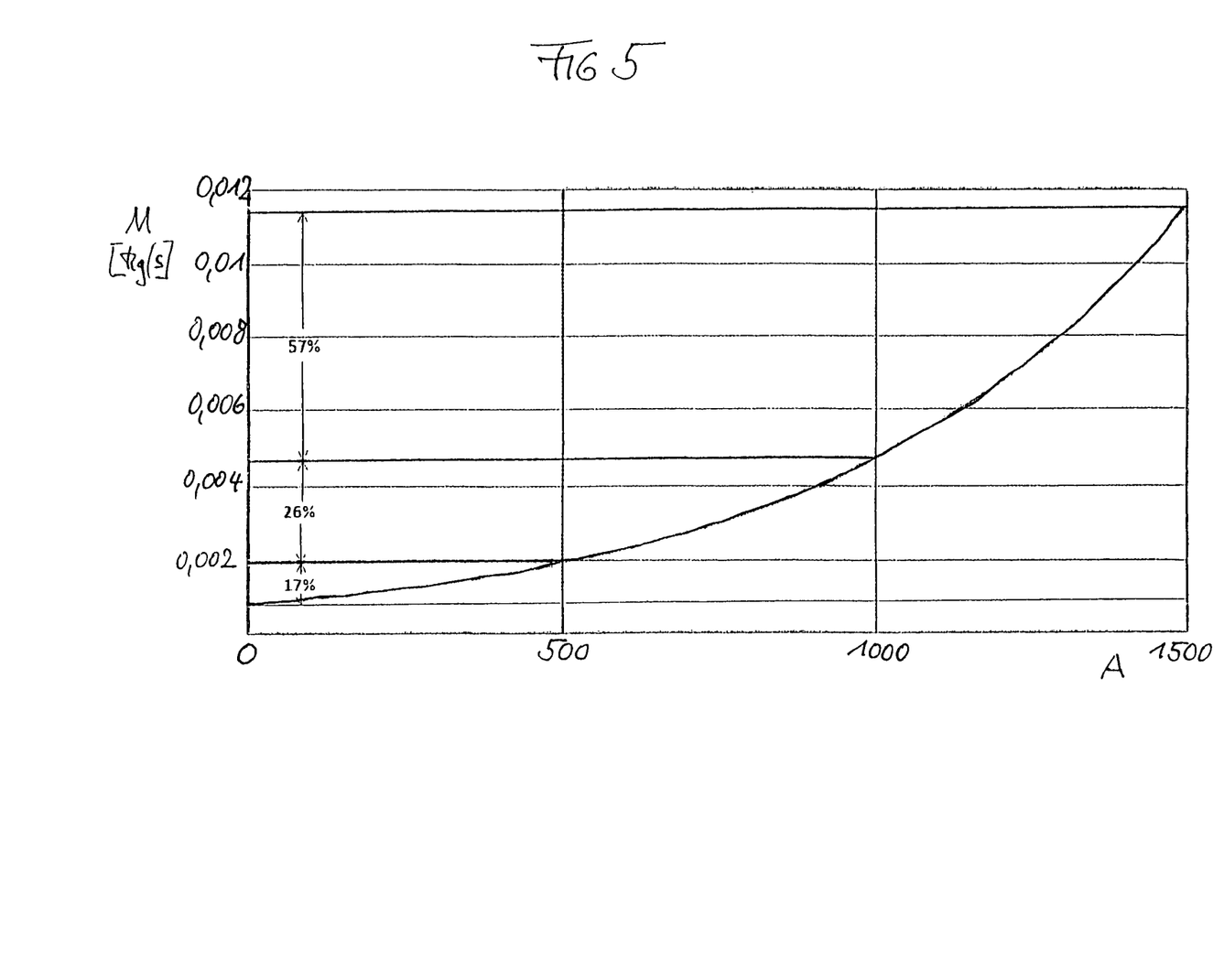
FIG. 5 depicts an example for the dependence of the gaseous fuel flow-rate on the position of the valve body.

FIG. 5 shows the ratios in an exemplary manner. On the abscissa, the number A of steps is depicted, by which the actuator 29 configured as a stepper motor is actuated, wherein in each step the metering end portion 24 is moved upward in accordance with FIG. 2 from a lowermost end position. Thus, A indicates the position of the valve body 18 relative to the outlet opening 22 in the axial direction of the outlet opening. The total amount of travel amounts, e.g., to approximately 8 mm. The ordinate indicates the mass flow M of the gaseous fuel flow Φ2 in kg/s. The mass flow M is proportional to the width b of the annular gap 42. It is assumed that the mass flow M reaches a maximal value after 1,500 steps. In the embodiment according to FIG. 5, the mass flow after 1,000 steps amounts to 43% of the maximal value and after 500 steps 17% of the maximal value. As is apparent, the mass flow M progressively increases with increasing displacement of the valve body, namely during the first 500 steps from a minimal value to 17% of the maximal value, after 500 additional steps by an additional 25% to 43% of the maximal value and after 500 additional steps by 57% to the maximal value.

During the controlling or regulation of the admixing of the gaseous fuel flow into the intake pipe flow, the following criteria are to be fulfilled:

1. For a precise lambda regulation, i.e. control of the ratio of the mass flow of the intake pipe flow Φ1 to the mass flow of the gaseous fuel flow Φ2 such that a predetermined value, which can depend on the operational parameters of the internal combustion engine, is maintained, a high level of control quality, i.e. a small step width, is required.

2. The mixture flow Φ3 or the total mass flow must instantaneously follow as much as possible the load requirements on the internal combustion engine, i.e. the position of the load controlling element, such as a throttle valve disposed in the intake pipe 10 upstream of the outlet 28, i.e. it must be changeable within a short time between a minimal valve and a maximal value. The gaseous fuel mass flow must follow this total mass flow, i.e. it also must be changeable within a short time from a minimal value to a maximal value.

So that the second-mentioned criterion is fulfilled, the step motor can be controlled by the electronic control apparatus 34 with a corresponding rapid change of the load requirement, e.g., within 50 ms it can be moved by 1,500 steps, so that a rapid tuning of the gaseous fuel flow $\Phi 1$ to the intake pipe flow $\Phi 2$, e.g., the fresh air flow, controlled by the load controlling element, is possible. The changing of the gaseous fuel flow in dependence on the intake pipe flow takes place in a controlled manner, preferably by storing in the electronic control apparatus 34 the dependence of the position of the valve body 18 on the load controlling element or on the output signal of a mass flow measuring apparatus disposed in the intake pipe upstream of the outlet 28. The actuator 29, which is preferably configured as a stepper motor, displaces the valve body in accordance with this feed forward control (driver control), wherein the position of the valve body is sensed by the rotary position encoder 32. Superimposed onto the feed forward control (driver control) of the gaseous fuel flow, a controlling of the position of the valve body 18 preferably takes place in the control apparatus 34 with the assistance of the output signal of the oxygen sensor 38. If the output signal of the lambda sensor 38 deviates from a target value, which is accessible in the electronic control apparatus 34, a stepwise adjustment of the valve body 18 takes place such that the deviation returns to zero as much as possible. So that a high level of control quality is achieved, the step width of the stepper motor or actuator 29 during a control operation decreases in the range of larger gaseous fuel mass flows. As is apparent from FIG. 5, a constant step width in the range of larger gaseous fuel flows leads to a larger change of the gaseous fuel flow than during small gaseous fuel flows. Therefore, as soon as the gaseous fuel flow $\Phi 2$ amounts to more than 15% of the maximal gaseous fuel flow, the mode of the stepper motor is switched, e.g., from a whole step mode to a half step mode by halving the step width of the stepper motor. In the range of higher gaseous fuel mass flows, e.g., at gaseous fuel mass flows greater than 50% of the maximal flow, it can be switched to a quarter mode by decreasing the step width to a quarter of the step width in the normal mode. In this way, a high level of control quality can be achieved during the control operation.

The invention, which was described above in an exemplary manner, can be modified in various ways:

The non-linear dependence of the cross-section of the annular gap 42 can also be achieved by the position of the valve body 18 such that the valve body or its metering end portion 24 has a constant cross-section and the outlet opening 22 is formed with a varying cross-section in the axial direction. The flow guiding surface 26 need not be formed directly in the bottom wall 40 of the housing 12, but rather can be formed by a separate flow guiding part, which ends in the outlet 28.

To actuate the valve body 18, various actuators could be provided, e.g., pneumatic or hydraulic actuators, which preferably do not necessarily have to operate as stepper actuators.

The gaseous fuel admixing device is preferably entirely accommodated in the housing 12 so that it can be mounted on any existing intake pipe, wherein the intake pipe need only be furnished with a hole. The intake pipe need not necessarily have a circular cross-section.

The slit forming the outlet need not necessarily be formed on a flow guiding surface that leads from the outlet opening to the slit.

With the inventive gaseous fuel admixing device, the following advantages, among others, are achieved:

The gaseous fuel can be changed between idling and full throttle with a high dynamic of displacement.

Lambda regulation can take place at every operational point with high precision.

The combustible gas mixture supplied to the internal combustion engine exhibits a good homogeneity.

The device is applicable to various engines in a simple manner, because the adaptation can take place merely by software changes.

The device combines, preferably in a simple compact form, the functionalities, gas admixing, gas metering to the fresh air and the gas-/air mixture formation in only one component.

REFERENCE NUMBER LIST

10 Intake pipe
12 Housing
14 Gaseous fuel admixing device
16 Guide component
18 Valve body
20 Gaseous fuel supply conduit
22 Outlet opening
24 Metering end portion
26 Flow guiding surface
28 Outlet
29 Actuator
30 Output shaft
32 Rotary position encoder
34 Electronic control apparatus
36 Wires
38 Oxygen sensor
40 Bottom wall
42 Annular gap
44 Hole
46 Fan
$\Phi 1$ Intake pipe flow
$\Phi 2$ Gaseous fuel flow
$\Phi 3$ Total flow

The invention claimed is:

1. A device for mixing a gaseous fuel into an oxygen-containing gas flow of a gas-powered internal combustion engine, the device including:
    a housing component configured to be connectable to an intake pipe of the internal combustion engine, the housing component having an inlet configured to connect to a gaseous fuel supply conduit and an outlet that is configured to open into the intake pipe, the outlet having an outlet opening that transitions into a slit having a longitudinal extension oriented approximately perpendicular to an axial direction of the intake pipe, and
    a valve body that is movable relative to the housing component,
    wherein an annular gap between an end portion of the valve body and the outlet opening has a cross-sectional area that varies in accordance with changes in the position of the end portion of the valve body relative to the outlet opening, the annular gap defining a flow-through cross-section of a passageway between the inlet and the outlet, and
    the slit is arranged such that a gaseous fuel flow exhausting from the slit is directed approximately perpendicular to the axial direction of the intake pipe.

2. The device according to claim 1, wherein the slit is configured to spray the gaseous fuel flow in the shape of a widening fan.

3. The device according to claim 1, wherein:
    the valve body is linearly and axially movable relative to the outlet opening and to the slit and the valve body has an outer contour that is shaped such that the cross-sectional area of the annular gap between the outlet opening and the end portion of the valve body progressively increases in accordance with movement of the valve body away from the outlet opening.

4. The device according to claim 1, wherein:
a flow guiding surface continuously extends within a wall of the housing component from the outlet opening to the slit located at an outer surface of the housing component, and is configured to guide the gaseous fuel flow that has passed through the annular gap into and through the slit, and
the slit is configured to be disposed on an inner circumferential surface of the intake pipe.

5. The device according to claim 1, further comprising:
an electronic control apparatus configured to control an actuator operably coupled to the valve body to achieve a predetermined ratio between the gaseous fuel flow rate ($\Phi 2$) and the flow rate of the oxygen-containing gas flow ($\Phi 1$) flowing through the intake pipe.

6. The device according to claim 5, wherein the actuator comprises a step actuator configured to move the valve body in a step-wise manner.

7. The device according to claim 6, wherein the valve body has an outer contour that is shaped such that the cross-sectional area of the annular gap between the end portion of the valve body and the outlet opening progressively increases from a minimal value to a maximal value in accordance with movement of the valve body away from the outlet opening.

8. The device according to claim 7, wherein the electronic control apparatus is configured to receive as inputs: (i) a load signal representative of a position of a load controlling element of the internal combustion engine and (ii) a lambda signal generated by an oxygen sensor, and
the electronic control apparatus is configured to move the valve body in a step-wise manner by a first step width when the load signal changes and, in case the lambda signal deviates from a predetermined value, to move the valve body by a second step width.

9. The device according to claim 8, wherein the second step width is equal to the first step width below a predetermined cross-sectional area of the annular gap and is smaller than the first step width above the predetermined cross-sectional area of the annular gap.

10. The device according to claim 9, wherein the second step width is equal to the first step width for cross-sectional areas of the annular gap smaller than 20% of the maximal cross-sectional area of the annular gap.

11. The device according to claim 10, wherein the end portion of the valve body is linearly and axially movable relative to the outlet opening and to the slit.

12. The device according to claim 1, wherein:
a flow guiding surface is extends from the outlet opening to the slit within a wall of the housing component, and is configured to guide the gaseous fuel flow flowing through the annular gap into and through the slit, and
the wall of the housing component is configured to be fixed to the intake pipe such that the slit lies on or adjacent an inner circumferential surface of the intake pipe in an unmovable position relative to the intake pipe.

13. The device according to claim 12, wherein the slit is configured to spray the gaseous fuel flow in the shape of a planar, widening fan.

14. The device according to claim 13, wherein the end portion of the valve body has a circular parabaloid shape and the outlet opening has a circular cross-section such that the cross-sectional area of the annular gap between the end portion of the valve body and the outlet opening exponentially increases from the minimal value to the maximal value in accordance with movement of the valve body away from the outlet opening.

15. The device according to claim 14, wherein the flow guiding surface that connects the outlet opening to the slit and is funnel-shaped and the slit has an elongated rectangular shape.

16. A device for mixing a gaseous fuel into an oxygen-containing gas flow of a gas-powered internal combustion engine, the device including:
a housing defining an inner chamber having an inlet configured to receive the gaseous fuel and an outlet configured to fluidly communicate with an intake pipe of the internal combustion engine, the outlet being formed in a wall of the housing and comprising a circular outlet opening that transitions into a slit defined on an outer surface of the wall, the slit having a longitudinal extension that is longer than a lateral width and the wall is configured to be attached to the intake pipe so as to orient the longitudinal extension of the slit perpendicular to an axial direction of the intake pipe, and
a valve body having an end portion with a circular cross-section and being disposed within the inner chamber so as to be movable relative to the outlet opening to define a variable annular gap between the end portion of the valve body and the outlet opening.

17. The device according to claim 16, wherein the end portion of the valve body has a circular parabaloid shape, the slit has an elongated rectangular shape, the outlet opening transitions into the slit in a funnel shape and the cross-sectional area of the annular gap between the end portion of the valve body and the outlet opening exponentially increases from a minimal value to a maximal value in accordance with movement of the valve body away from the outlet opening.

18. A method for mixing a gaseous fuel into an oxygen-containing gas flow of an internal combustion engine, the method comprising:
supplying the gaseous fuel to an inner chamber of a housing; and
moving a valve body relative to the housing to adjust a cross-sectional area of an annular gap between an end portion of the valve body and an outlet opening defined in a wall of the housing, wherein gaseous fuel flows through the annular gap and then through a slit defined in the wall in fluid communication with the outlet opening such that a substantially planar gas flow is exhausted into an intake pipe of the internal combustion engine perpendicular to an axial direction of the intake pipe.

19. The method according to claim 18, wherein the end portion of the valve body has a circular parabaloid shape, the slit has an elongated rectangular shape, the outlet opening transitions into the slit in a funnel shape and the cross-sectional area of the annular gap between the end portion of the valve body and the outlet opening exponentially increases from a minimal value to a maximal value in accordance with movement of the valve body away from the outlet opening.

20. The method according to claim 19, wherein:
the valve body moves relative to the housing in a step-wise manner according to a first step width or a second step width, the second step width is equal to the first step width below a predetermined cross-sectional area of the annular gap and the second step width is smaller than the first step width above the predetermined cross-sectional area of the annular gap.

\* \* \* \* \*